US010657792B1

(12) United States Patent
Knas et al.

(10) Patent No.: US 10,657,792 B1
(45) Date of Patent: May 19, 2020

(54) LOCATION-BASED WARNING NOTIFICATION USING WIRELESS DEVICES

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/163,314

(22) Filed: Oct. 17, 2018

Related U.S. Application Data

(63) Continuation of application No. 15/874,250, filed on Jan. 18, 2018, now Pat. No. 10,152,872, which is a continuation of application No. 15/654,177, filed on Jul. 19, 2017, now Pat. No. 9,881,484, which is a continuation of application No. 15/372,027, filed on Dec. 7, 2016, now Pat. No. 9,721,451.

(60) Provisional application No. 62/266,245, filed on Dec. 11, 2015.

(51) Int. Cl.
G08B 21/24 (2006.01)
G08B 25/10 (2006.01)
G08B 21/22 (2006.01)
G01C 21/20 (2006.01)

(52) U.S. Cl.
CPC ........... G08B 21/24 (2013.01); G01C 21/206 (2013.01); G08B 21/22 (2013.01); G08B 25/10 (2013.01)

(58) Field of Classification Search
CPC combination set(s) only.
See application file for complete search history.

(56) References Cited

U.S. PATENT DOCUMENTS

| 5,987,377 | A | 11/1999 | Westerlage et al. |
| 7,860,524 | B2 | 12/2010 | Laible et al. |
| 7,970,425 | B2 | 6/2011 | Balachandran et al. |
| 8,660,781 | B2 * | 2/2014 | Cobbold ............... G06Q 10/10 701/117 |
| 9,585,079 | B2 | 2/2017 | Todasco et al. |
| 9,706,357 | B2 * | 7/2017 | Heo ..................... H04W 4/029 |
| 9,721,451 | B1 * | 8/2017 | Knas .................... G01C 21/206 |

(Continued)

Primary Examiner — Travis R Hunnings
(74) Attorney, Agent, or Firm — Eric L. Sophir; Foley & Lardner LLP

(57) ABSTRACT

A method and system for generating warning notifications using wireless indoor navigation technology is disclosed. The method comprises determining a location for an individual and a transportation device by receiving device identifiers (e.g., distinctive combination of numbers and/or characters uniquely identifying receiving devices associated with the individual and the transportation device) and location information, received from one or more beacons, from the receiving devices. The method comprises determining a location associated with the individual and the transportation device based on the location information and/or the device identifiers. The method also comprises receiving a destination location and determining an intended path for the transportation device. The method comprises warning the individual upon determining that the location associated with the individual is within a predetermined proximity to the transportation device or its intended path.

18 Claims, 4 Drawing Sheets

(56) References Cited

U.S. PATENT DOCUMENTS

| | | | |
|---|---|---|---|
| 9,881,484 B1* | 1/2018 | Knas | G01C 21/206 |
| 10,152,872 B1* | 12/2018 | Knas | G01C 21/206 |
| 2002/0049534 A1* | 4/2002 | Yuda | G01C 21/365 |
| | | | 701/533 |
| 2004/0048620 A1 | 3/2004 | Nakahara et al. | |
| 2005/0169223 A1 | 8/2005 | Crocker et al. | |
| 2005/0169252 A1 | 8/2005 | Riggs | |
| 2005/0216190 A1 | 9/2005 | Obata | |
| 2009/0009322 A1* | 1/2009 | Ramirez | G01S 1/68 |
| | | | 340/539.13 |
| 2010/0026495 A1* | 2/2010 | Fast | G01S 5/0018 |
| | | | 340/572.1 |
| 2011/0225068 A1 | 9/2011 | Figueroa et al. | |
| 2013/0046648 A1 | 2/2013 | Calman et al. | |
| 2013/0332297 A1 | 12/2013 | Forutanpour et al. | |
| 2014/0210616 A1* | 7/2014 | Ramachandran | G08B 21/0227 |
| | | | 340/539.13 |
| 2015/0018011 A1 | 1/2015 | Mendelson | |
| 2015/0156567 A1* | 6/2015 | Oliver | H04W 4/80 |
| | | | 340/870.07 |
| 2015/0317682 A1 | 11/2015 | Kayser et al. | |
| 2015/0350413 A1 | 12/2015 | Ma et al. | |
| 2015/0358778 A1* | 12/2015 | Heo | H04W 4/029 |
| | | | 455/456.6 |
| 2016/0105515 A1 | 4/2016 | Murdock et al. | |
| 2016/0150362 A1* | 5/2016 | Shaprio | G08B 21/0266 |
| | | | 340/539.13 |
| 2016/0169695 A1 | 6/2016 | Hall et al. | |
| 2016/0321771 A1* | 11/2016 | Liu | G06Q 50/30 |
| 2016/0364823 A1* | 12/2016 | Cao | G06Q 50/30 |
| 2017/0131105 A1 | 5/2017 | Buscemi | |
| 2017/0169366 A1* | 6/2017 | Klein | G06Q 10/025 |
| 2017/0237950 A1 | 8/2017 | Araya et al. | |

\* cited by examiner

LOCATION-BASED WARNING NOTIFICATION USING WIRELESS DEVICES

CROSS REFERENCES TO RELATED APPLICATION

This patent application is a continuation application of U.S. patent application Ser. No. 15/874,250, filed Jan. 18, 2018, which is a continuation of U.S. patent application Ser. No. 15/654,177, filed Jul. 19, 2017, which is a continuation application of U.S. patent application Ser. No. 15/372,027, filed on Dec. 7, 2016, which claims priority to U.S. Provisional Patent Application Ser. No. 62/266,245, filed on Dec. 11, 2015, each of which is incorporated by reference in their entirety for all purposes.

This application is related to U.S. patent application Ser. No. 15/862,543, filed Jan. 4, 2018, which is incorporated by reference in its entirety for all purposes.

FIELD OF DISCLOSURE

The present application relates generally to systems, methods, and other embodiments associated with data transmittal between a beacon and a mobile device.

BACKGROUND

Large buildings, such as office campuses, can be disorienting and confusing to navigate. This problem is particularly acute when many buildings and floors look the same, which can be troublesome for clients/employees unfamiliar with the building(s). Furthermore, many building may have hazardous and dangerous conditions such as employees operating heavy machinery and other dangerous equipment. Current warning methods involves manually locating and tracking people within the path of these heavy equipment and verbally warning them, which has proven to be inaccurate, inefficient, and cumbersome.

SUMMARY

For the aforementioned reasons, there is a need to utilize indoor positioning systems for better management, guidance, and warning of individuals navigating within buildings. There is a need for an efficient and accurate computer system and method to manage indoor navigation and automatically generate notifications to warn individuals regarding hazardous conditions within the building. The systems and methods disclosed herein attempt to address the above-mentioned shortcomings in the art and provide a variety of other benefits. The systems and methods described herein can create, maintain, transmit, and utilize data from receiving devices and beacons.

In an embodiment, a method comprises receiving, by a server, a first device identifier and first location information from a first receiving device, the first location information being associated with a first location of the first receiving device received from a plurality of beacons, wherein the first device identifier comprises a distinctive combination of at least one of numbers and characters uniquely identifying the first receiving device. The method comprises determining, by the server, a location associated with the first receiving device based at least on one of the first location information and the first device identifier. The method comprises receiving, by the server, a destination location from the first receiving device. The method comprises determining, by the server, a path associated with the first receiving device, wherein the path corresponds to the location associated with the first receiving device and the destination location. The method comprises receiving, by a server, a second device identifier and second location information from a second receiving device, the second location information being associated with a second location of the second receiving device received from a plurality of beacons, wherein the second device identifier comprises a distinctive combination of at least one of numbers and characters uniquely identifying the second receiving device. The method comprises determining, by the server, a location associated with the second receiving device based at least on one of the second location information and the second device identifier. The method comprises determining, by the server, whether the location associated with the second receiving device is within a predefined zone relative to the location of the first receiving device. The method comprises determining, by the server, whether the path associated with the first receiving device is within a predefined zone relative to the location of the second receiving device. The method comprises, upon at least one of the location associated with the second receiving device being within a predefined zone relative to the location of the second receiving device and the path associated with the first receiving device being within the predefined zone relative to the location of the second receiving device, generating by the server, a notification comprising at least one of a warning message. The method further comprises transmitting, by the server, the notification to the second receiving device.

In another embodiment, a computer system comprises a server, which is configured to receive a first device identifier and first location information from a first receiving device, the first location information being associated with a first location of the first receiving device received from a plurality of beacons, wherein the first device identifier comprises a distinctive combination of at least one of numbers and characters uniquely identifying the first receiving device. The server is configured to determine a location associated with the first receiving device based at least on one of the first location information and the first device identifier. The server is configured to receive a destination location from the first receiving device. The server is configured to determine a path associated with the first receiving device, wherein the path corresponds to the location associated with the first receiving device and the destination location. The server is configured to receive a second device identifier and second location information from a second receiving device, the second location information being associated with a second location of the second receiving device received from a plurality of beacons, wherein the second device identifier comprises a distinctive combination of at least one of numbers and characters uniquely identifying the second receiving device. The server is configured to determine a location associated with the second receiving device based at least on one of the second location information and the second device identifier. The server is configured to determine whether the location associated with the first receiving device is within a predefined zone relative to the location of the second receiving device. The server is configured to determine whether the path associated with the first receiving device is within a predefined zone relative to the location of the second receiving device. The server is configured to upon at least one of the location associated with the first receiving device being within a predefined zone relative to the location of the second receiving device and the path associated with the first receiving device being within the predefined zone relative to the location of the second receiving device, generate a notification comprising warning message. The server is further configured to transmit the notification to the second receiving device.

A beacon is small, battery-friendly device that sends out a low-voltage signal, such as Bluetooth Low-Energy (BLE), for a programmable distance between about a few cm to 40-50 m. In addition, some smartphones can act as beacons. The frequency of sending the signal can also be programmable; for example, a signal can be sent every 100-400 milliseconds. Beacons can be placed strategically indoors or outdoors to perform many actions.

Beacons can transmit small packets of data or data packets. Here the term "Beacon" applies to any device, mobile or fixed, that is capable of transmitting a data packet. A data packet can be the same as defined in the Bluetooth specification or any other data packet that transmits a unique identifier. Currently, beacons repeatedly transmit data packets in set intervals. The iBeacon system (implemented by Apple®) utilizes iBeacons (a form of beacon) to transmit a data packet consisting mainly of three pieces of information—a Universally Unique Identifier (UUID), a major field, and a minor field. And an iBeacon typically transmits that packet over and over again. Further information about beacons can be found in the Supplement to the Bluetooth Core Specification, Version 5, which is incorporated by reference herein.

In one use case, retailers use these beacons or transmitters as a hyper-local device tracking mechanism, i.e., to locate smartphones within the proximity. Non-limiting examples of transmitters include an iBeacon, AltBeacon, and EddyStone, a wireless router, a cellular phone, a tablet, a workstation, or any other suitable computing or other electronic device. Location-based information is provided to a clients'/consumers' personal device based on its receipt a packet from a beacon. One or more mobile applications on receiving devices can use the data packet to assess current location or other information. For instance, the one or more applications can transmit information, such as a UUID, contained in the data packet, to a server to retrieve information associated with the data packet. These data packets also allow for delivery of specific content to users based on location. For example, an iBeacon located in aisle 3 of a personal goods store transmits its UUID to consumers'/clients' mobile devices. If a consumer has a smartphone that contains the application for the personal goods store, then the store can transmit special offers for products sold in aisle 3. The UUID portion of the data packet is associated with the personal goods store while the major and minor field identifies specific section and aisle of the personal goods store. The iBeacon devices are little power-efficient sensor-like devices that do not receive anything, but transmit an identity in a given proximity, about a 30-foot range.

Additional information can be gleaned from BLE signals, including an approximate distance between the beacon and the receiving device. Beacons can be programmed to broadcast their signals at different power levels, known as the "Broadcasting Power." The BLE beacon can transmit its Broadcasting Power to the receiving device, which can approximate its distance from the beacon by comparing the Broadcasting Power to the strength of the signal as received, known as the Received Signal Strength Indicator (RSSI).

The term "beacon" as used herein refers to any device configured to transmit a data packet, which is used by a receiving device to identify the transmitting device and compute the relative distance between the transmitting device and the receiving device. Beacons can be physical devices or virtual beacons. Beacons transmit small packets of data. Currently, beacons repeatedly transmit data packets in set intervals. There are several types of beacons and associated protocols available in the market such as iBeacon system (implemented by Apple®), AltBeacon (provided by Radius Networks), and EddyStone® (from Google®). The iBeacons and AltBeacons broadcast a data packet consisting mainly of following pieces of information—a Universally Unique Identifier (UUID), a major number, a minor number, and a transmission power level known as the "Broadcasting Power." These formats require external databases to give meaning to the beacon data packets. Receiving devices can approximate distance from the beacon by comparing the Broadcasting Power to the strength of the signal as received, known as the Received Signal Strength Indicator (RSSI). As these devices typically transmit that packet over and over again, this type of transmission defines the functionality of beacons. These data packets are recognized only by special apps on the mobile phone of the users. Beacons supporting the Eddystone format broadcast three different packets: a unique ID number, a URL address, and telemetrics based on sensors. They don't require an external database; instead they use web links to either link to data directly and could function via a two-way communication method. The Eddystone-URL frame type broadcasts information that can be used by a phone even without a specialized application. Virtual beacons may not require specialized devices and may use existing indoor positioning systems and the user devices to deliver location-based information. Beacons can be configured to broadcast sensor data such as temperature and battery level, or even data gathered from other sensors in the room such as motion-detectors.

One embodiment includes beacons or transmitters at fixed locations, such that a user walking by can receive data packets from the transmitters, and the data packets have different distance granularities associated with them. For instance, users may not walk closely enough to transmitters that transmit only a short range, e.g., 1 m diameter. However, a transmitter that transmits with a larger diameter, e.g., 10 m, may be able to cover an entire hallway or corridor, and therefore a user could not avoid receiving a data packet from that transmitter if they went through the hallway or corridor.

In addition to tracking which transmitters a user passed, one or more applications on the receiving device may make additional uses of the data packets from the transmitters. For example, an application on the receiving device may offer the user information about the area around the beacon, such as how far it is from the user's destination, whose offices are nearby the beacon, how far the beacon is from various destinations, such as the cafeteria or coffee shop, the name of the building of location of the building. Buildings are often described in a grid format, with rows and columns having letters or numbers, respectively. Therefore, the data packet can either contain the row and column of the transmitter or the application can get that information using the transmitter's unique identifier.

Some embodiments allow for inter-application communication. For instance, a user may have a list of action items to accomplish, such as visit a co-worker's desk, drop off a computer at the information technology office, or stop at corporate nurse for evaluation. Such information could be stored in the same application on a user's receiving device as the one tracking the user's position, or it could be stored in a separate application.

In another use case, a receiving device (e.g., a smartphone or any other device configured to communicate with a beacon) can also transmit a data packet, acting as a beacon, which can be received by another receiving device, fixed or mobile. In either case, fixed or mobile, this reception serves to notify the receiver that the mobile transmitter is nearby. As an example, a mobile application could instruct a mobile device to transmit a data packet associated with a social network identity which, upon reception at another device, fixed or mobile, could indicate the proximity of a social network user. In this embodiment, receiving devices could be placed throughout a building. These receiving devices would monitor the receiving devices location to track where the user has been. The system of this embodiment could then store the information of which transmitters the user went past, and the user can use an application to retrieve this information. This embodiment has the disadvantage of using the user's device as a beacon, which could drain the battery more quickly than using it simply as a receiving device. Nonetheless, this embodiment has advantages because there need not be transmitters constantly broadcasting throughout the building, and depending on the number of transmitters needed, there could be significant cost/complexity savings using this method.

Some embodiments can use RSSI or triangulation to assess more accurately the location of a receiving device. For instance, the receiving device may receive signals from more than one source or of more than one type, e.g., Wi-Fi, BLE, and GPS. By relying on more than once source, these embodiments are more reliable and more accurate.

One problem with current beacon technology is that they are single use, and therefore do not present accurate granular location information. Embodiments of the present invention solve this problem by allowing one or a plurality of beacons to transmit information at different ranges to provide more granular location information.

Additional features and advantages of an embodiment will be set forth in the description which follows, and in part will be apparent from the description. The objectives and other advantages will be realized and attained by the structure particularly pointed out in the exemplary embodiments in the written description and claims hereof as well as the appended drawings. It is to be understood that both the foregoing general description and the following detailed description are exemplary and explanatory, and are intended to provide further explanation of embodiments as claimed.

BRIEF DESCRIPTION OF THE DRAWINGS

The accompanying drawings constitute a part of this specification and illustrate some embodiments.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
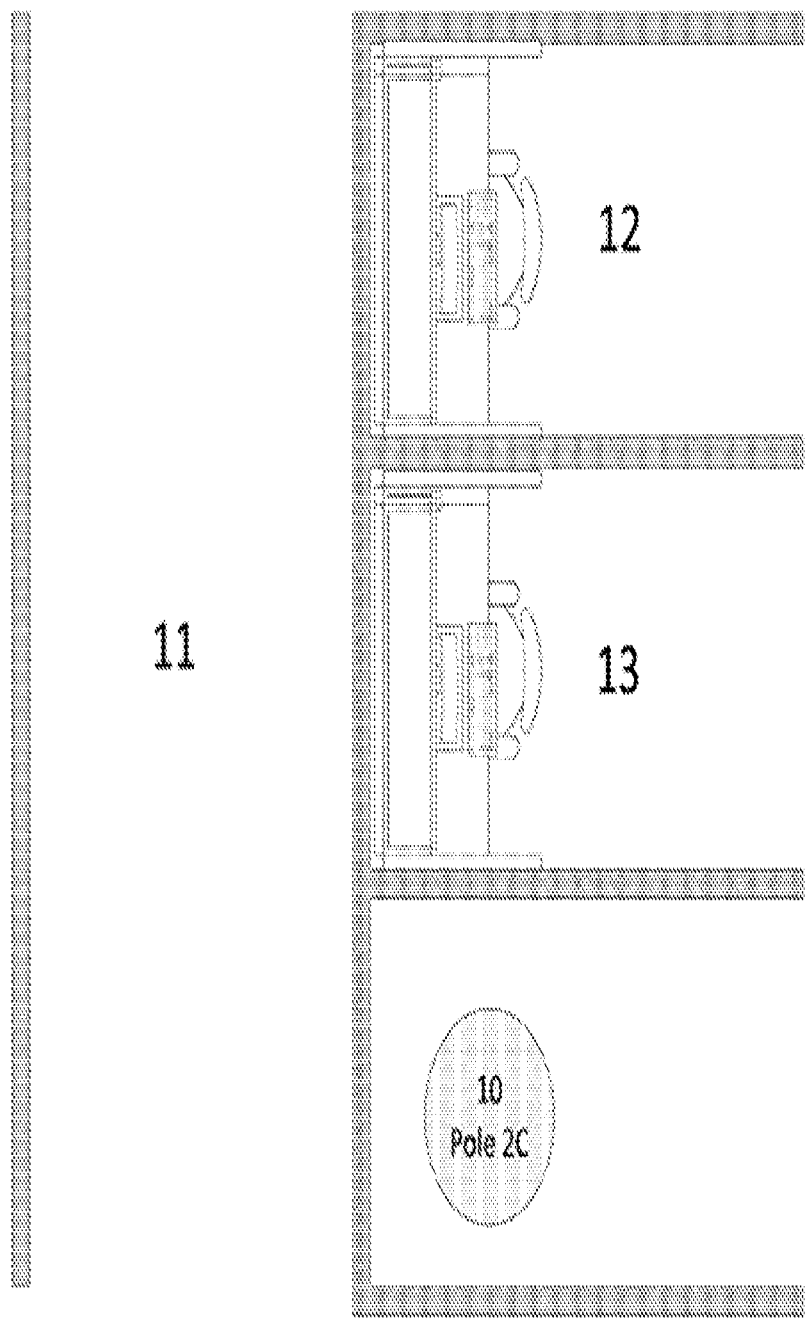
FIG. 1 illustrates an embodiment of beacon transmitters included in an office building.

FIG. 1 illustrates a block diagram of a section of a building according to one embodiment. The hallway 11 is adjacent to transmitter 10, which is affixed to pole 2C. Pole 2C can be a support pole. Other embodiments include affixing transmitter 10 to a wall or the ceiling (not shown), or anywhere else it may be convenient to locate transmitter 10. Two cubicles are near pole 2C and can have an address of 2C, and hence have an address that includes 2C, and perhaps a floor number if the building has multiple floors, and a building number if there are multiple buildings on the campus. Transmitter 10 can broadcast data packets any supported distance. For example, transmitter 10 can broadcast data packets a distance sufficient to extend across hallway 11, which would ensure that users who walk through hallway 11 can receive a data packet. FIG. 1 also illustrates cubicles 12 and 13 that are associated with pole 2C. It is common in large buildings and building complexes to associate locations with poles on floors to make it easy to find specific locations within large areas. Cubicles 12 are only for illustrative purposes. Embodiments include other large spaces, such as warehouses, docks, exhibition halls, stadiums, and amusement parks. In some embodiments, a map associated with all the above-mentioned locations are stored in the location management database and retrievable upon instructions/command of an analytical server (described in FIG. 4).

Figure 2:
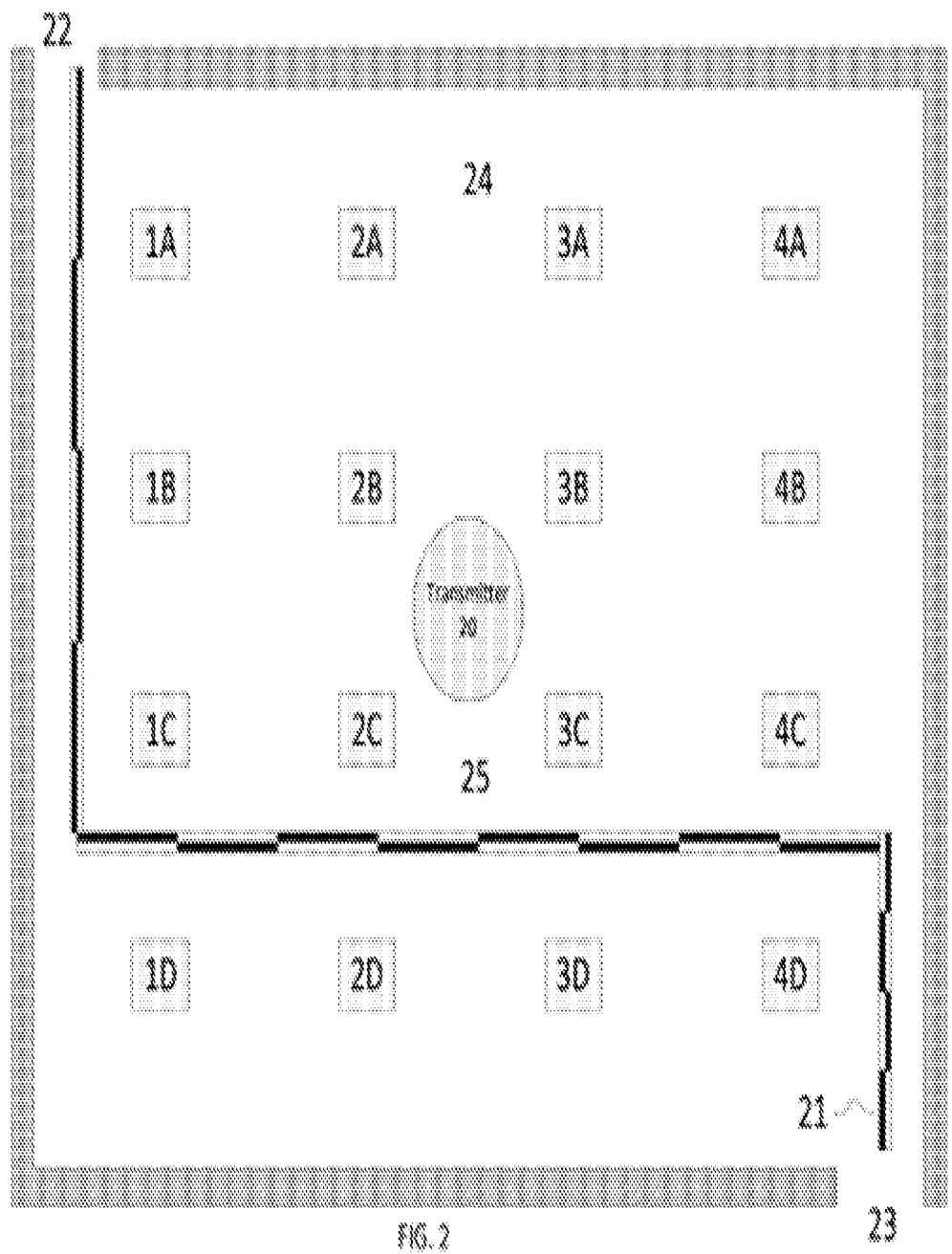
FIG. 2 illustrates an embodiment having a grid of poles on the floor of a building.

FIG. 2 illustrates a building having a four-by-four grid of poles 1A-4D. As stated above, this space can be occupied for any number of uses, including the cubicle use illustrated by FIG. 1. FIG. 2 further illustrates a transmitter located near the center of the building. These transmitters can be configured to transmit its unique identifier across the entire space. This embodiment can work in cooperation with or exclusive to a more granular embodiment in which transmitters do not broadcast over entire floors. Specifically, in the example of FIG. 1, transmitter 10 broadcasts data packets a distant sufficient to extend across hallway 11, but not so far as to cover other hallways, so that the analytical server can identify more accurately where the receiving device is located. If transmitter 20 works in cooperation with one or more transmitters 10, attached to one or more of poles 1A-4D, the analytical server can identify the location of a receiving device with more granularity. If the receiving device receives no data packets from transmitters other than transmitter 20, then the analytical server can only identify that the receiving device was located in the room of FIG. 2, but not exactly where in the room the receiving device was located.

If the receiving device only receives data packets from transmitter 20, then the analytical server (explained below) can determine the receiving device's location. For instance, in some embodiments, if the receiving device was previously in a room adjacent to the room in FIG. 2, then the analytical server can determine that the receiving device went through the entrance 22, upon entering the room 24. The analytical server may query a database in order to receive a map associated with the current location of the receiving device (e.g., based on the received identifiers, the analytical server may detect which map to query) and determine the overall layout of the building and the location of the receiving device in relation to the transmitting beacon. Further, the analytical server may be able to extrapolate how far the user was from the transmitter at different times by using the RSSI functionality in BLE. In the example in which the receiving device is determined to have entered via entrance 22, the analytical server could also have detected that the receiving device exited via exit 23 because the receiving device received another data packet in the room connected to room 24 via exit 23. Therefore, the analytical server can determine that the receiving device moved from entrance 22 to exit 23. The analytical server can also determine what path the receiving device took to get from entrance 22 to exit 23 by using the RSSI distance information. If the distance between path 21 and transmitter 20 is equal to the closest equivalent to the point 25, then the analytical server can determine that the receiving device passed within that distance from transmitter 20. The analytical server can also extrapolate the speed at which the receiving device was travelling. This can be determined based on the normal speed at which the receiving device moves, or based on prior samples of the speed at which the receiving device moved. The analytical server can average those prior samples to determine an average speed of the receiving device. Using the start location, end location, distance from the transmitter, and average speed of the receiving device, the analytical server can determine a best option as to the path the receiving device took, absent better information. In the alternative, the analytical server can generate a path that is best for that user, e.g., the fastest path, one past restrooms or a water fountain, or a path past known stops associated with the receiving device, such as a colleagues' cubicle. The analytical server may generate the path or query existing paths from a database associated with the floor map. The analytical server may also display the path on the user device (e.g., mobile device or other electronic device).

When a user of the receiving device wants to return to their point of origin, they can use an application on the receiving device to recall the path they took to get to the destination. The analytical server can rebuild the user's path, using data from the receiving device, to direct the user back to their point of origin, such as an exit to the parking lot where they parked. The analytical server may display a path 21 similar to that illustrated in FIG. 2. The analytical server could display the entire path through each building, or display a path on a room-by-room basis. Other embodiments could also include directions to go past the poles that the receiving device passed by. In the example of FIG. 2, those poles could be 1A, 1B, 1C, 2C, 3C, 4C, and 4D.

In some embodiments office numbers may be used instead of pole numbers, where the first number of the office number signifies the floor that the office is on. Alternatively, the first number could be the building number, and the second number could be the floor number. The location of a particular cubicle or office may be associated with a computer-readable identifier, e.g., a memory address, such that the analytical server can search the location of such an office or cubical by hashing the computer-readable identifier or going to a memory address to retrieve the office or cubicle location. Similarly, if someone moves offices, the map including the transmitters and floor lay out can be reprogrammed to reflect the changes. In addition to poles having transmitters attached to them, individual offices and conference rooms can have one or more transmitters in them to ensure there is coverage throughout a building. The analytical server may query a database to update a map associated with the location (e.g., location management database as explained in FIG. 4).

A location management database (operating under instructions from the analytical server) may automatically update user profile information with unique identifiers associated with locations where the user frequently visits (or is located). For example, the analytical server can identify that a user now does not visit their old office and instead spends the majority of their days in a different office. The analytical server can then determine that the user has moved to a new office after a predefined number of days, such as 10 days or another pre-determined threshold for time is satisfied. The analytical server may generate an instruction configured to update a database associated with the analytical server (e.g., location management database or another database associated with the user) and transmit the instruction to update the record within the database.

The location information can be presented, by the analytical server, on the user's mobile device, via uploaded maps, and the location of the user can be presented on the map via, for example, a blue dot. The analytical server can also present the location of other users by presenting the location of others using their pictures, which can be entered by the users in a mobile application or API associated with the analytical server (explained below) or retrieved from the Internet, including social networks such as LinkedIn®. While the analytical server can present a user's location at all times, the analytical server could alternatively, or in addition, allow users to search for other user's current location (e.g., through the mobile application associated with the analytical server). The analytical server can also allow for navigation on the map, such that a path 21 may appear similar to how it does in FIG. 2.

People may be concerned about privacy, so some embodiments can have privacy settings. For instance, some embodiments could be entirely opt-in, which means that users can configure their applications or settings to ensure that no one can find their location, yet they could view others' locations. Or, users can provide settings such that only particular users, such as members of their team or friends, can view their location. Users can also enable or disable tracking, so they can be tracked or not tracked as desired. The analytical server can also show more coarse information, such as which building a receiving device is in rather than a more detailed location within a building. Users can therefore choose to not allow others to see exactly where they are, only which particular building. Users can also turn off their receiving devices or smartphones, or disable the particular wireless radio or antenna that enables tracking, to disable tracking. In some embodiments, the user may access a mobile application/API associated with the analytical server (download the application on the receiving device such as a mobile application or access user's account) and update user preferences, which may include all the above-mentioned options/preferences.

In some embodiments, the analytical server may generate a notification to warn users regarding their location. For example, some buildings can have transportation devices, such as large machinery moving on the floors that can kill or injure people if there is a collision. The analytical server can track the location of the heavy machinery (e.g., query a database associated with the building and receive data regarding the heavy machinery such as the type and the location of the machinery) and warn users that are nearby, e.g., 50 feet that the heavy machinery is nearby, so the users can be on alert. The analytical server can also query the drivers of the heavy machinery to regarding their intended path, and then automatically warn users that are nearby that path or that go nearby that path while the heavy machinery is en route. For example, the analytical server may display a request for the driver of the machinery to input their intended destination or path into an input device, such as a smartphone, tablet computer, or integrated computing device in the transportation device, which would then send the intended destination to the analytical server that could automatically determine where the transportation device will operate to send notifications to receiving devices nearby the intended path. Notifications can include audible and textual warnings that a transportation device is operating in the area and to take precautions. Notifications could include a simple warning, or a status of where the transportation device is and when it will arrive. The notifications could be postponed until the transportation device is within a certain distance from a receiving device, such as 200 feet or on the same floor. The notifications may also cooperate with mapping software on the receiving device to show where the transportation device is on a map.

In some other embodiments, the analytical server allows users to locate people who are injured. For instance, a friend might want to check to verify that a diabetic friend is OK, and they can go to where the analytical server says the diabetic person is to see whether they are OK. In some other embodiments, the analytical server can display a shortest path to a medical supply area (e.g., a defibrillator) by querying the location management database and generating the path accordingly.

In some embodiments, the analytical server may generate a notification if a user is immobile for more than a pre-determined time period. For example, a user (in a nursing home) may not have moved beyond their room for an unusual amount of time (e.g., more than a time value, which satisfies a pre-determined threshold), which would be logged via the user's receiving device not having moved, which could trigger a notification for the nursing home staff to check on the resident. The analytical server could also automatically place a phone call to the resident to see whether they answer the phone and ask for confirmation that they are well. If the resident does not answer the phone or does not confirm that they are well, the analytical server can then notify nursing home staff to check on the resident. The analytical server can also assign a priority to this action depending on how long the nursing home resident has not moved.

In some embodiments, the location tracking can also be used by third parties to identify people or victims in emergencies, such as a fire. In these embodiments, public emergency personnel, including police and firemen, can access the location information of all people, or only people inside of the building. The emergency personnel can also have access to a list of people not accounted for via a communication device, such as a smartphone, computer, or tablet. The communication device would have to be secure such that non-emergency personnel could not have access to the location information. Security can include encryption, proprietary emergency wireless communication frequencies, or passwords associated with buildings to prevent unauthorized people from accessing the location information. This emergency victim location system would work similarly to the system of logging a user's path, but allows for emergency personnel to also access this information via a secure method. This secure method can only be activated in an emergency, such as when a fire alarm is pulled. This would further ensure that there would not be any unauthorized access. People not accounted for can include people who are known to have entered the building, such as by using an entrance badge with an RFID or their receiving device received a unique identifier associated with the entrance, but who have not been known to exit the building. As such, the emergency personnel can focus their efforts on locating these people.

The analytical server could also work in cooperation with third-party tracking software to provide alternative means for tracking. For instance, a system for tracking within a building (utilizing the analytical server) could be private, but work in cooperation with a third party application, such as Facebook® to continue to track a user after they leave a building. The analytical server could either hand-off tracking to Facebook®, such that users must use that application to track people, or the analytical server could use an application programming interface (API) to retrieve users' locations from Facebook and display Facebook's information in a different application.

In another embodiment, the analytical server may generate a list for a user for socialization purposes. For instance, if a lunch buddy is not in their office, a user can locate their lunch buddy using the disclosed system, and decide whether to contact them or wait for them if they might return soon. Else, the user could see that their lunch buddy had alternative plans or is not at work, and proceed to lunch without them. In addition, the analytical server may also allow people to identify new people to go to lunch with. Users can identify in their profiles whether they are interested in going to lunch with others. If so, the analytical server can place the user's name on a list of people available for lunch. The analytical server can verify that such people are in the building, and if they are, others can select them for having lunch. The analytical server can also identify a lunch buddy at random. These types of meetings can be highly valuable at companies, as they encourage diverse thinking and a broader institutional knowledge for employees, potentially leading to new ideas and projects that could lead to new products or services for the company. The analytical server can include profile pictures of everyone within the notification, which would make it easier for people to identify new lunch buddies if they meet in cafeteria. The analytical server can also direct the parties directly to each other using the navigation feature.

In other embodiments, the analytical server can allow for electronic tours of a building or campus of buildings. A user can request a tour of the first floor of the main building to see points of interest, such as the cafeteria a company exhibit, or an on-campus credit union. The user can request tours of different portions of the campus at different times or on different days. The user can also request a tour with a guide or to go on the tour with others. This can make the tours more efficient and allow other company employees to do different, possibly more valuable work. Companies can encourage users to participate in the lunch buddy program or to take tours of the campus. Users can automatically receive rewards, such as lunch coupons, for participating.

People are often inundated with unwanted notifications that can cause distraction; therefore, in some embodiments, the analytical server can suppress unwanted notifications. For example, the analytical server may provide users with an option to turn off notifications completely, or users may only allow certain types of notifications or a certain number of notifications. Notifications can have different priorities. For instance, safety-related notifications can have the highest priority. Users can set priorities of notifications. For instance, if a user's boss is nearby, the analytical server can allow the user to set a high-priority notification. Low priority notifications can include a request for a lunch buddy or other pre-identified people are nearby. While the analytical server may allow users to modify the priority of some notifications, some notification priorities might be static, such as safety notifications. In some other embodiments, if a user desires only a certain number of notifications, the analytical server could wait a certain amount of time before displaying notifications, and then only display the highest priority notifications until reaching the notification limit.

In some embodiments, the analytical server can generate notifications after certain meetings. For instance, after meetings with certain people, the analytical server could notify a user to generate a report or generate a check sheet, which is a type of report. This embodiment can automatically require the user to fill out the report or check list in the same application or open another application to generate the report or check sheet. The report or check list can be in audio or visual form, and the user can enter information either using their voice or any other input means of a computer or smartphone. These reports can be generated automatically at the end of a meeting, during the meeting, or when the user returns to a predefined location, such as their desk or home.

In these embodiments, a system used for tracking the user in the building (via the analytical server) can determine whether the user has returned to their desk and then automatically require the user to generate a report, either on their receiving device or on a personal computer on their desk. Similarly, the receiving device can receive location information from sources other than terrestrial transmitters that transmit a few meters. Location information can be gathered from GPS, WiFi, or other applications on the receiving device. For instance, the receiving device may have an API for retrieving the receiving device's location. In either case, when the user reaches a predefined location, such as their home or office, the analytical server can require input to an automatically generated report or checklist. The automatically generated report or checklist can include pre-filled fields. These can include the attendees names, time of meeting, location, and meeting agenda gleaned from data in an electronic calendar. This can require the analytical server generating an instruction to access the user's calendar, either on the user's receiving device, personal computer, or stored in the cloud. The analytical server can also report data on how long the meeting last based on when the receiving device entered and exited the room where the meeting took place. This time can differ from the scheduled meeting time if the meeting finished quickly or went overtime. Other data that the receiving device can include is a recorded transcript of the meeting. This transcript can be converted to a textual transcript either on the receiving device or on the cloud, such that the audio and textual transcripts can be available to the user when the report or checklist is automatically generated. The user may modify or complete the report or checklist, and the analytical server may allow the user to store the audio or textual transcript with the report for future reference.

In some embodiment, the analytical server may query user's calendar and determine the time and location (and other relevant information such as topic, other participants, and the like) of a meeting, and generate an instruction to activate an audio recording module associated with the receiving device as soon as the analytical server determines that the user has entered the location of the meeting in order to transcribe the meeting notes. The analytical server may also track the location of the user and display a notification (e.g., a notification to remind the user to generate the report) on a device associated with the user (e.g., the receiving device, a mobile device, or a personal computer associated with the user). For example, if the user has not generated the report within a week after the meeting (or another time threshold) the analytical server may generate a notification reminding the user to complete the report.

In some embodiments, the analytical server can search for certain keywords in the transcript to pre-fill additional fields or otherwise aid in generating the report. For example, a checklist can require that certain topics be discussed during the meeting. The analytical server (using a natural language recognition algorithm) may identify the key words and use them to automatically fill one or more portions of the report. In a simple example, the report could identify whether the parties used those words during the meeting (e.g., was a guarantee ever made? Did the parties ever talk about a warranty?). In a more complicated example, the analytical server could record who the beneficiaries of a contract are by determining that one or more names coming after the word "beneficiaries" or "beneficiary" in the transcript would be the beneficiaries. If the user asks the question properly and receives a proper response, the analytical server could also include the proportional interest that each beneficiary has. For instance, a spouse may have a 50% interest and a child may have a 50% interest, and the analytical server could search the transcript of the meeting for the words "beneficiaries" or "beneficiary" and find the names and their interests to automatically populate the report with this information.

The analytical server can be configured to use both GPS and the system of transmitters, such as BLE beacons, so that the report generation features will activate for off-site and on-site meetings. Both BLE beacons and GPS satellites both broadcast unique identifiers used to uniquely identify the source of the transmission. The methods of identifying the location of a beacon are as explained above, while the methods for identifying location using GPS are well-known to those skilled in the art. However, embodiments of the present disclosure use these methods of determining location to create greater efficiencies in recording, reporting, and tracking meetings to make people more productive, allowing them to focus their attention on other tasks.

By logging user's location (e.g., modifying the data record associated with the user), the analytical server can take actions based on a user's location. For instance, computers and lights can turn off and on based on whether a user is arriving or departing. The analytical server can also automatically log the amount of time a user is in the building or at their desk for purposes of pay or for logging productivity. The analytical server may connect with a database or a building management system associated with the location of the meeting (e.g., location management database) and generate instruction to turn the lights on/off or display certain presentations.

Figure 4:
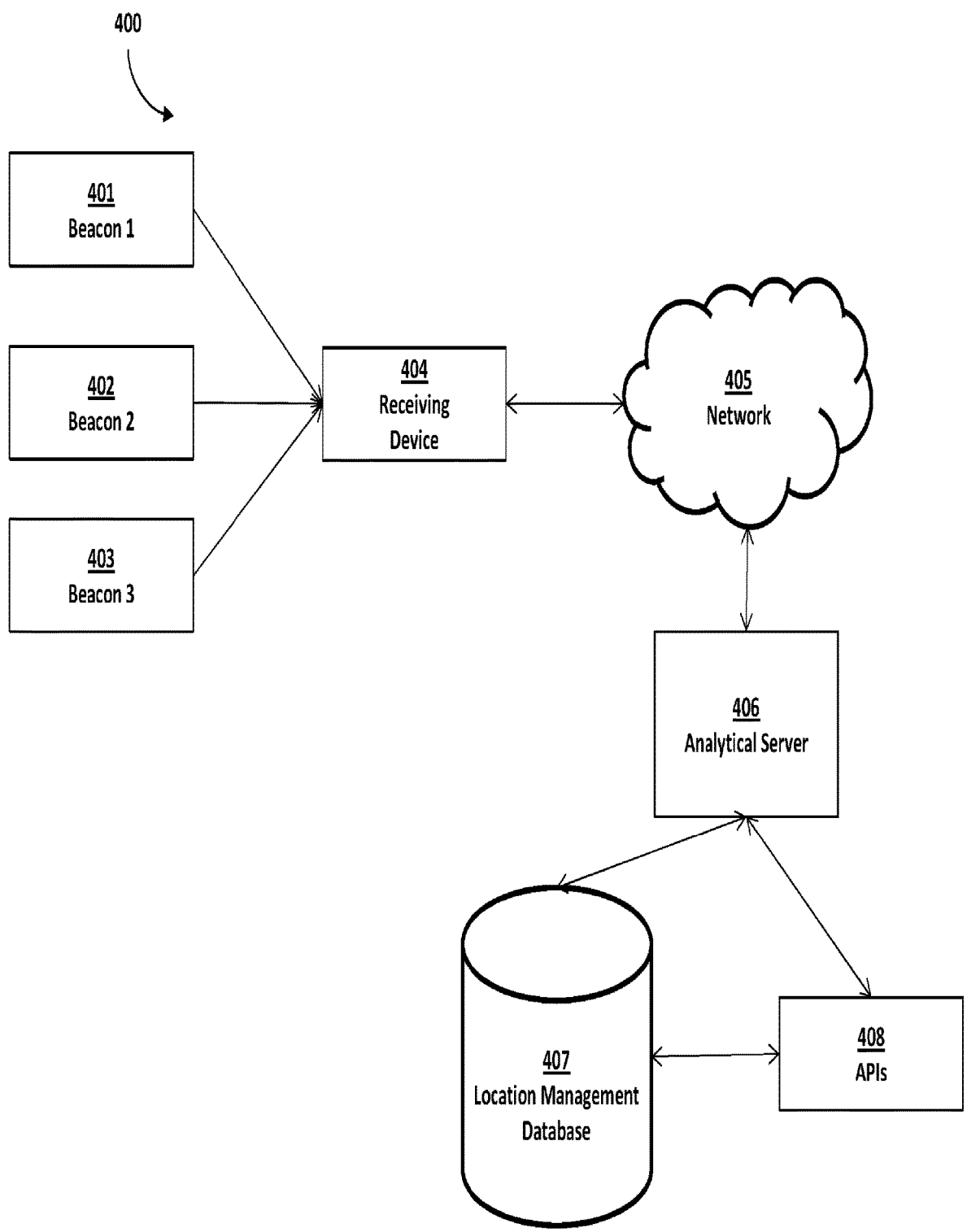
FIG. 4 is a block diagram illustrating a location management system containing an analytical server, according to an embodiment.

Certain embodiments include a system for communicating information between a location management database, a receiving device, one or more beacons, and an analytical server. FIG. 4 is a block diagram illustrating a system 400 containing analytical server 406, according to an embodiment. A plurality of beacons, for example 401, 402, and 403 transmit a plurality of location signals that are received by a receiving device 404. The receiving device 404 then transmits a device identifier and the plurality of location signals from the plurality of beacons 401, 402, and 403 via a network 405 to one or more servers constituting the analytical server 406. The system 400 also includes a location management database 407 hosted by or communicatively coupled to the analytical server 406. The location management database 407 is configured to store one or more records of a plurality of identifiers, unique device identifiers, individual location information and profiles, individual location notification preferences, and the like.

The receiving device 404 can be any mobile location-aware computing devices, e.g., wearable, smartphone or tablets that can receive a wireless signal from one or more transmitters of location signals. When the receiving device 404 receives the location signals, it may process it using one or more mobile applications in communication with one or more servers constituting the analytical server 406. In some embodiments, the UUIDs or unique identifiers of the beacons 401, 402, and 403 must be programmed and associated with particular locations where they are installed. The beacons 401, 402, and 403 continuously broadcast information, for example in the form of data strings, at a predetermined interval, like a heartbeat of data broadcasts, which are then captured by one or more applications on the receiving devices. The data fields in these broadcasted data strings could include an identifier of an individual beacon, location of the beacon in the office space, time of day, and any information designed for consumption by the receiving devices 404. The receiving device 404 may be, for example, any mobile computing device with one or more web browsers or other specific applications. It should be appreciated that the software modules described herein may be distributed among the devices of the system 400 in varying permutations.

The analytical server 406 may be any computing device, including one or more servers, comprising non-transitory machine-readable storage media, processors, and software modules capable of performing various tasks and processes described herein. In an embodiment, an application can be downloaded to a receiving device that is able to communicate with the server. The application can be created and maintained by same party who maintains the analytical server 406. In certain embodiments, component features of the server may reside on separate physical devices. The analytical server may be any computing device comprising non-transitory machine-readable storage media, processors, and software modules capable of performing various tasks and processes described herein. In an embodiment, an application can be downloaded to a receiving device that is able to communicate with the server. The application can be created and maintained by same party whom maintains the parking lot. The server may be communicatively coupled over a network to one or more software modules and devices, including transmitters 10 and 20 (FIG. 1) and the receiving device 404. In certain embodiments, component features of the analytical server 406 may reside on separate physical devices.

The location management database 407 is a body of information associated with the location of the beacons, locations of the user, user preferences, and the like organized as records. This database can comprise information regarding individual consumers/clients and users such as available receiving devices, profiles, preferences, location history from a particular receiving device, and the like. Information in these databases can be stored or retrieved dynamically using appropriate storage management software. For example, the location management database 407, in some embodiments, can be a database containing information regarding the beacons 401, 402, and 403, their locations, online calendars associated to them, or any information for the client. The location management database 407 can be part of the analytical server 406, however, in some embodiments the location management database 407 may reside on a different computing device than the server (e.g., a distributed computing environment).

The system 400 may also include a network 405, which is any common communication architecture that facilitates communication between computing devices. For example, the computing devices communicating over the network 405 would be the receiving device 404, one or more beacons 401, 402, and 403, the analytical server 406, and the location management database 407. One having ordinary skill in the art would appreciate that the network may be the Internet, a private intranet, or some hybrid of the two. The network 405 may be comprised of any combination of devices and protocols capable of facilitating communication between computing devices. Non-limiting examples of devices comprising the network 405 may include routers, switches, hubs, firewalls, proxy servers, telecommunications trunks, and the like. Non-limiting examples of protocols employed by the network may include TCP/IP, Wi-Fi, Bluetooth®, 3G, Wi-Max, and the like. Wireless communication between one or more receiving devices and one or more transmitters may be performed with a relatively short-range wireless communication protocol such as Wi-Fi, Bluetooth, high frequency systems, or other relatively localized wireless communication protocols. The network 405 may be any common communication architecture that facilitates communication between computing devices.

Beacons 401, 402, and 403 may be any computing or other electronic device comprising a processor and a wireless interface capable of transmitting signals to a receiving device. The signals may contain binary data, and the binary data may represent various types of data and/or information for the receiving device 404 to consume and implement. The components of the receiving device 404 receiving the signals, may translate the signals into useful binary data triggering various tasks and process according to the application executed by the receiving device 404. The beacons 401, 402, and 403 may implement any suitable components for wirelessly communicating with the receiving device 404, or other receivers. The technological components may include wireless networking hardware and the related protocols, such as a Bluetooth low energy (BLE) interface chip and the Bluetooth wireless communication protocols. An example of beacons 401, 402, and 403 may be transmitters 10 and 20 (described in FIG. 1) and may be any computing or other electronic device comprising a processor and a wireless interface capable of transmitting signals to a receiving device. The transmitters 10 and 20 may implement any suitable components for wirelessly communicating with the receiving device 404, or other transmitters. The technological components may include wireless networking hardware and the related protocols, such as a Bluetooth low energy (BLE) interface chip and the Bluetooth wireless communication protocols.

In some embodiments, UUIDs may be random or pseudo-random data strings (numbers or characters) associated with a device (e.g., receiving device) or device component (e.g., Bluetooth interface, wireless network interface). A UUID may be as complex as a number represented by 128-bits, and have a structure and construction determined by the protocol utilizing the UUID (e.g., 802.11, Bluetooth, NFC), and in some cases, the variant or version of the protocol. It should be appreciated that any suitable implementation and version of UUIDs may be employed to identify devices in the system (e.g., location management database 407). Non-limiting examples of techniques for generating a device's UUID may include a time-based version with unique or random host identifier, a DCE Security version (with POSIX UIDs), a name-based version using an MD5 hash, a random or pseudo-random UUID version, and a name-based version using a SHA-1 hash. For example, in certain embodiments, the UUID comprises the MAC address of the computer that is generating the UUID, and a time stamp associated with the moment the UUID is generated, which could be the number of 100-nanosecond intervals that have passed since midnight.

In certain embodiments, the data strings from the beacon can consist of two other identifiers—a major field and a minor field. The major field is a short data string used to distinguish a smaller subset of beacons within the larger group. The minor field is a shorter data string that may be used to distinguish an even narrower subset within that smaller subset of beacons. For example, the minor field can be used to identify individual beacons. Alternatively, the major and minor fields can together be viewed as comprising a single flat (non-hierarchical) space wherein individual beacons can be identified. In certain embodiments of the invention, the beacon can consist of information regarding transmission power, which is used to determine proximity (distance) from the beacon. The data strings from the beacon can comprise both constant identifiers that do not change with every broadcast and dynamic identifiers that change with every broadcast.

In certain embodiments of the invention, the beacon transmits repeated broadcasts of data strings. The timing of the broadcasts and the construction of the data strings can vary arbitrarily. The iBeacon device may broadcast the same data string repeatedly, i.e., continuous broadcasting of the data string with the actual identifiers of the beacon. In certain embodiments, the beacon is modified such that the broadcasting of the data string with the actual identifiers is interspersed by broadcasting of data strings that contain varying identifiers. The timing of the broadcasts and the construction of the identifiers in the data strings can be according to a predetermined pattern. The timing of the broadcasts and the construction of the identifiers in the data strings can therefore be retrieved from a database or computed on demand as needed. The timing of the broadcasts and the construction of the identifiers in the data strings can be devised in any combination of the foregoing. In certain embodiments, the data string with the actual identifiers has a specific combination of characters. For example, the data string with the actual identifiers has a specific combination of UUID, a major field, and a minor field. The beacon transmits this data string with the actual identifiers along with subsequent transmissions of data strings where the UUID is constant but the major field or the minor field or both fields change. The periodicity of transmission of the data string with the actual identifiers during the broadcast of the data strings that contain varying identifiers from the beacon can vary arbitrarily. The periodicity of transmission of the data string with the actual identifiers during the broadcast of the data strings that contain varying identifiers from the beacon can be according to a predetermined pattern. Embodiments can include a cloud-based wireless registry and location management system, and at least two other devices—a beacon which transmits one or more data strings and a receiving device that receives the transmitted information from the beacon. The beacon transmits the data strings in a certain characteristic pattern. In certain embodiments, the beacon transmits a data string, which is associated with a key that is shared with the cloud infrastructure. The keys can be shared over a secure channel before the transmission of the beacon. The key can be used to manage data integrity and authentication of message. In certain embodiments, the key can determine the periodicity of transmission of the data string with the actual identifiers during the broadcast of the data strings that contain varying identifiers from the beacon.

In certain embodiments, this pre-shared key is known by both the wireless registry and the beacon. The beacon broadcasts at least one data string with the actual identifiers and one data string with varying identifiers. In certain embodiments, the data strings with varying identifiers include changing the major field or the minor field or both fields over time. The data strings with changing major field or minor field or both over time can be the result of pseudo random sequence generators. Certain embodiments include data strings with varying identifiers constructed using cryptographic hash functions that take data input and generate a hash function. The hashing functions can be constructed using a variety of algorithms, for example a keyed-hash message authentication code (HMAC), either MD5, SHA1 or SHA256 or such. Certain embodiments utilize a pre-shared key combined with a time component. The time component can be a synchronized function, wherein a known output is provided at a given point in time. This synchronized time function is known to both the beacon and the cloud-based database.

In certain instances, the beacon can broadcast data strings that include changing minor fields, and this can be part of the authentication process. In certain instances of beacon authentication, the beacon transmits a data string with the actual identifiers every other time or every first, third, fifth, and every odd transmission. For example, during every even instance of transmission of data strings, the beacon transmits a data string with the actual identifiers. In the next odd instance of the transmission, the beacon transmits a data string with varying identifiers, such as a data string containing a static UUID and major field identifiers, along with a dynamic identifier—the minor field that changes with time. The dynamic identifiers can change in a pseudo random manner that is a function of time and the pre-shared key. In the next even instance of the transmission, the beacon transmits a data string with the actual identifiers, and then in the next transmission, the beacon will contain the original UUID and the major field but now with a different minor field. And thus, this beacon will be associated with a characteristic pattern of transmitted data strings.

In certain instances, the beacon can broadcast data strings that include changing major and minor fields, and these fields can be part of the authentication process. For example, during every fifth instance of transmission of data strings, the beacon transmits a data string with the actual identifiers. In the other four instances of the transmission, the beacon transmits a data string with varying identifiers, such as a data string containing a static UUID identifiers, along with along with the dynamic identifiers—the major field or the minor field or possibly both that change with time. And thus, this beacon will have a different characteristic pattern based on at least the frequency of appearance of the data string with the actual identifiers, and the changes in the dynamic identifiers of the other data strings.

In addition to using unique identifiers from beacons or transmitters 10 and 20, the analytical server can also triangulate using other signals, such as WiFi signals. The analytical server can use WiFi and RSSI similar to how was described above using RSSI with BLE. Other signals that can be used to identify location include CDMA, LTE, and WiMax.

Appendix A includes pseudo-code for a transmitter and a receiving device. The pseudo-code includes modules for transmitting, receiving, and processing information corresponding to unique identifiers. The pseudo-code includes infinite loops, which, in the case of a receiving device, continuously poll a register for a unique identifier. In the case of a transmitter, the infinite loop allows for continuous transmission of unique identifiers to be received by the receiving devices. Alternative embodiments include using interrupts instead of polling. For instance, the pseudo-code could be written to sleep until receiving a unique identifier, such that the receiving device uses less power while waiting to receive a unique identifier.

Certain embodiments include a receiving device that receives the beacon broadcasts from the beacon and recognizes the pattern of beacon broadcasts, including the static and dynamic identifiers. And once this receiving device has collected a sufficient history of the beacon broadcasts, the information is sent to the cloud-based wireless registry and the location management system. Based on the pre-shared key associated with the static identifier, the analytical server determines the expected pattern of beacon broadcasts for the dynamic identifiers. The analytical server then compares the received broadcasts from the receiving device to those which itself determined. The degree of that verification, whether the beacon message is appropriately suited for the beacon or not, is sent back to the receiving device. Certain embodiments may require that the receiving device have access to a particular application to interact with the cloud-based wireless registry and location management system.

In certain embodiments, the beacons 401, 402, 403 may transmit the data strings in their characteristic pattern. A nearby receiving device receives these data strings and once a sufficient number of data strings have been collected, the receiving device communicates with the network server regarding the data strings. When the network server receives the information from the receiving device, the server processes the information to verify the authenticity of the information received by the receiving device or the integrity of the information received by the receiving device or both. Once verified, the receiving device receives knowledge of said verification. If the verification process fails, the network server can be designed to notify an administrator that flags the beacon or the transmission for the beacon. In certain embodiments, other security processes can be initiated to deal with the failure in the verification of the information.

In one embodiment a network server can receive information from a receiving device containing a collection of data strings received from the beacon. The server can connect to the one or more receiving devices through a public network such as the Internet, a local area network, a wide area network, a private network, telephone network, cable network, broadband network, Ethernet network, digital subscriber line (DSL) network, or any other network that enables servers and receiving devices to interact with one another. The server can include one or more processors, wireless receivers, displays, and one or more memory mediums.

Although FIG. 4 shows only a limited number of beacons 401, 402, and 403, it should be appreciated that more transmitters may be communicatively coupled to one another, over a wired and/or wireless network of transmitters. That is, locations, such as brick-and-mortar office buildings, schools, campuses of multiple buildings, governmental or administrative buildings, and the like, may implement localized networks of beacons to transmit and/or collect data, across a broader area. Furthermore, although the exemplary system described in FIG. 4 describes stationary beacons 401, 402, and 403, it should also be appreciated that beacons 401, 402, and 403 may be any suitable stationary or mobile devices that are capable of performing the various tasks and processes described herein. Thus, a collection of beacons 401, 402, and 403 can comprise a combination of mobile and stationary devices. It should also be appreciated that, although FIG. 4 describes beacons 401, 402, and 403 performing one-way signal transmissions, beacons 401, 402, and 403 may be capable of two-way communications (e.g., collecting data from signals transmitted by receiving devices), and may be capable of a number of functions or execute a variety of software modules. Non-limiting examples of beacons 401, 402, and 403 may include an iBeacon, AltBeacon, and EddyStone, a wireless router, a cellular phone, a tablet, a wearable, a workstation, or any other suitable computing or other electronic device. The data strings from the beacon can comprise both constant identifiers that do not change with every broadcast and dynamic identifiers that change with every broadcast.

In some instances, certain plurality of records can be provided by a partner application programmable interfaces (API) 408 associated to the analytical server 406 configured to process records associated with meal choices available at one or more facilities or workspaces. The APIs 408 can be any Representational State Transfer Application Programming Interface (REST API) that controls and manages one or more APIs. In these embodiments, API provides web services to one or more mobile applications installed on the computing devices. Examples of web services include showing data on a website, uploading large amounts of data that will later be consumed by a mobile app, downloading data to run custom analytics, exporting data, and the like. APIs are commonly a collection of one or more computing protocols and/or routines that indicate a software program's or software service's functions, and each function's requisite inputs. The APIs may be used to query and fetch data from databases, or pass information to other services or programs. For example, APIs may be used to communicate information and instructions to cloud-based services regarding the meal choices associated with particular micro-fenced locations.

Figure 3:
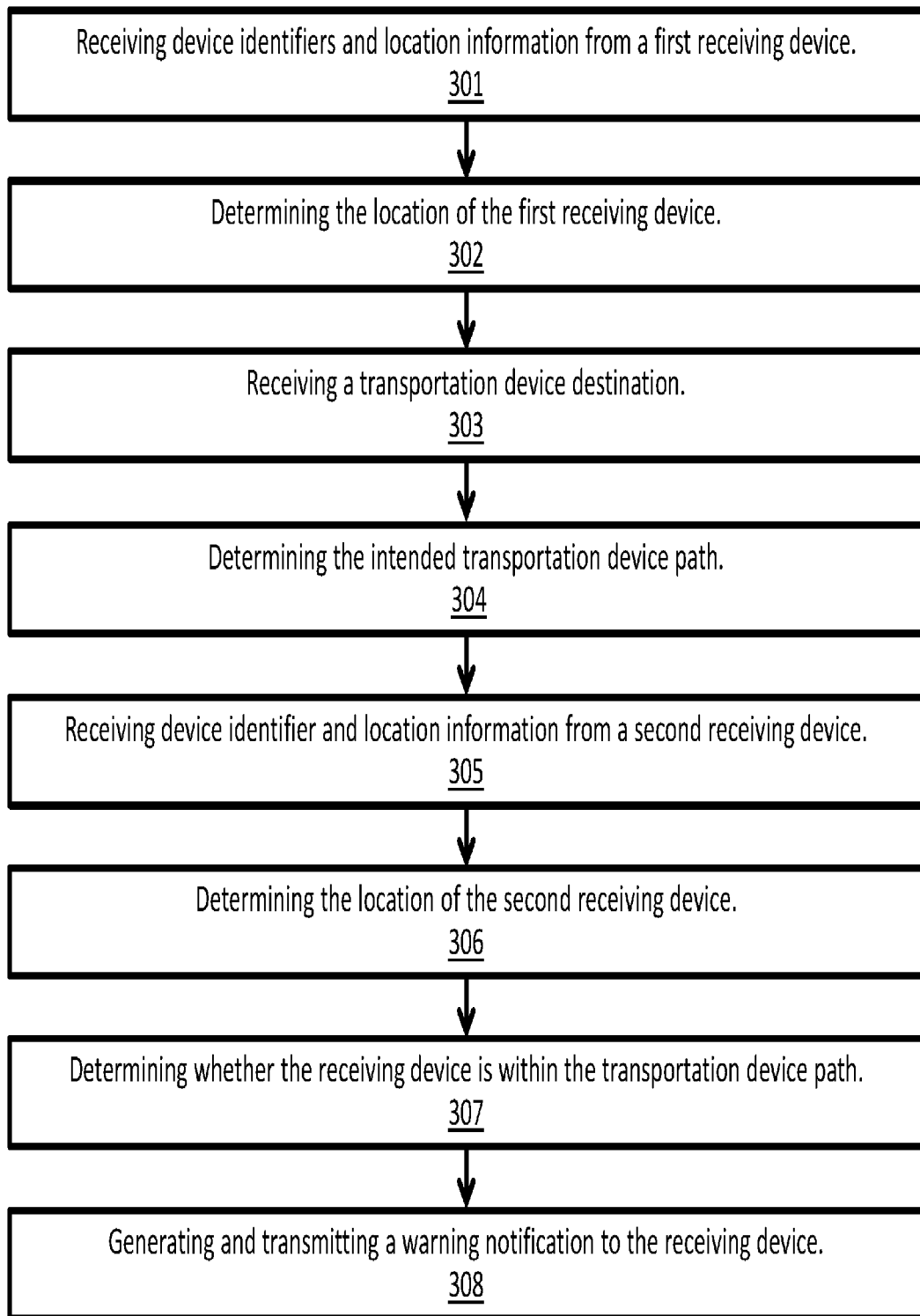
FIG. 3 illustrates a operational steps of a method for generating a meeting report, according to an embodiment.

Referring now to FIG. 3, a flowchart depicting operational steps of a method for generating a warning notification is illustrated, in accordance with an embodiment. Steps of the method 300 may be implemented using one or more modules of the analytical server, the beacon transmitters, and receiving devices associated with a transportation device or an individual/user (described in FIG. 4). FIG. 3 does not imply any limitations with regard to the environments or embodiments that may be implemented. Modifications to the depicted environment in FIG. 3 may be made.

At step 301, the analytical server may receive a first set of data from a first receiving device (e.g., a mobile device or any other electronic device configured to receive data or communicate with a wireless transmitter device such as a beacon). The first receiving device may be associated with a transportation device or heavy machinery (e.g., lift, fork lift, mobile crane, and the like). For example, the first receiving device may be attached to the transportation device or be carried by an operator of the transportation device. The first set of data may include a device identifier (e.g., a UUID as explained above) accompanied by data packets received from one or more beacons. The first set of data may be associated with a first receiving device within a predefined area from the beacon (e.g., a predetermine area, which the beacon is configured to transmit wireless identifiers). The first receiving device, within the predefined area, may receive an identifier from a beacon and communicate back with the beacon in order to establish a connection. In some embodiments, the analytical server may generate an instruction to query a database, using the unique device identifier associated with the first receiving device, and inquire more information about the transportation device or the first receiving device. The database may contain information regarding the type of the transportation device and whether a warning message is necessary. For example, if the transportation device is not designated as dangerous, the analytical server may not track its location or generate any warning messages to individuals around the transportation device. The analytical server may determine the type of the transportation device by matching the UUID received from the first receiving device with a transportation device category/type within the database. The analytical server may also query for attributes associated with a predefined zone (e.g., an area around the transportation device, which the analytical server is required to track individuals and warn them). For example, the predefined zone of 50 feet requires the analytical server to warn any individual within a 50 feet radius of the transportation device.

At step 302, the analytical server may determine a location associated with the first receiving device using any of the above-mentioned methods. The analytical server may retrieve a map (or other geographical information) from a database associated with the first receiving device or the identified location (e.g., location management database as explained in FIG. 4) and identify the location based on the transmitted identifier. The analytical server may also gage the strength of the transmission from each beacon transmitter (e.g., RSSI) in order to locate the first receiving device. In some embodiments, the analytical server may generate an instruction configured to query a database for a floor plan associated with the location of the first receiving device or a user associated with the first receiving device. For example, the analytical server may determine a work location for a user associated with the first receiving device, and generate an instruction configured to receive the floor plan for said location. In other words, if a user associated with the first receiving device is scheduled to work on the second floor of building A, the analytical server may query for a floor map or other data associated with the second floor of building A.

At step 303, the analytical server may receive an intended destination associated with the first receiving device (e.g., the transportation device or the user operating the transportation device). In some embodiments, the analytical server may transmit a notification to the first receiving device and request the destination location. At step 304, the analytical server may determine an intended path for the first receiving device based on the determined location and the intended destination of the first receiving device. The analytical server may also query the database associated with the building management and receive the intended path for the first receiving device. For example, if a transportation device (e.g., first receiving device) is scheduled to transport material from point A to point B, the intended path may be stored in a database associated with the first receiving device and/or the building management.

At steps 305 and 306, the analytical server may receive a second set of data from a second receiving device. The second set of data may, similar to the first set of data, contain device identifier (e.g., a UUID as explained above) accompanied by data packets received from one or more beacons. The second receiving device may be associated or operated by an individual/user navigating the building. The analytical server, as explained above, may identify the second receiving device and determine a location associated with the second receiving device. In some embodiments, the analytical server may generate a second query to receive information regarding the identified location of the second receiving device. Continuing with the example above, if the second receiving device is located within the second floor of building A, the analytical server may query a database, which contain floor map (and/or other data) associated with the second floor of building A. The analytical server may also query the database or transmit a request to receive (from the second receiving device) the predefined zone associated with the second receiving device. A person skilled in the relevant art will appreciate that the predefined zone received from the first receiving device may be a different value from the predefined zone received form the second receiving device. For example, a more cautious individual may need a broader zone to receive warnings.

At step 307, the analytical server may determine whether the location associated with the second receiving device is within the intended path of the first receiving device. The analytical server may also determine whether the location associated with the second receiving device is within the predefined zone (e.g., near the location of the first receiving device) relative to the first receiving device or the intended path of the first receiving device. At step 308, the analytical server may, upon determining that the location of the second receiving device is within the intended path of the first receiving device or within a predefined zone of the first receiving device (or its intended path), generate and transmit a warning notification to the first and/or the second receiving devices. In some embodiments, if there are more than one predefined zones inputted by the first and the second receiving devices, the analytical server may select the broader zone. For example, if the second receiving device has inputted 100 feet as a predefined zone and the first receiving device has inputted 50 feet, the analytical server may, upon determining that the second receiving device is located within 100 feet of the first receiving device (or its intended path), generate and transmit to display the warning notification on the second and/or first receiving devices. The warning notification may include a text or an auditory message identifying the first receiving device (e.g., the equipment associated with the first receiving device), the user operating the equipment, and/or the location of the first receiving device.

Embodiments present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and "etc.," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

APPENDIX A

Transmitter pseudo-code

```
int setUniqueIdentifer (int $uniqueIdentifier) {
    int global $globalUniqueIdentifier = $uniqueIdentifier;
    return (0);
}
int setTransmitPeriod (int $transmitPeriod) {
    int global $globalTransmitPeriod = $transmitPeriod;
    return (0);
}
int programInitialization ( ) {
    int $uniqueIdentifier;
    int $transmitPeriod;
    input ($uniqueIdentifier) \\user to input unique identifier
    \\$uniqueIdentifier = 0x12345678 \\uniqueIdentifier hardwired
    input ($transmitPeriod);
    setUniqueIdentifer ($uniqueIdentifier);
    return (0);
}
int main ( ){
    programInitialization( );
    while (1) {
        output ($outputRegister, $globalUniqueIdentifier);     \\Infinite loop that
                                                                \\will broadcast
```

APPENDIX A-continued

```
        wait ($globalTransmitPeriod);              \\unique identifier
                                                   \\periodically per
                                                   \\the global transmit
                                                   \\period.
    }
    exit (0);
}
```

Receiver pseudo-code

```
int retrieveUniqueIdentifier (int $received) {
    return (httpGet ("http:\\URL for server\" . $received));
}
int lookupUniqueIdentifier(int $received) {
    int $location = hash ($received);      \\retrieve data associated with received unique
                                           \\identifier.
    if ($location == 0) {                  \\$received is unknown, and therefore we look for it on a
                                           \\server or the Internet
        $location = retrieveUniqueIdentifier($received);
    }
    return ($location);
}
int scanForUniqueIdentifier ( ) {
    return (readRegister( )); \\reads register containing recieved unique identifiers.
}
int main ( ) {
    int $received = 0;
    int $breadcrumbs[1000] = 0;            \\it is assumed that 1000 entries is sufficient, but
                                           \\other embodiments can include more.
    int $directionsRequest;
    int $i = 0;
    int $j = 0;
    while (1) {
        scanForUniqueIdentifier ($received);
        scanForPathRecall ($directionsRequest);    \\if user requests directions, present
                                                   \\them.
        if ($directionsRequest == 1) {
            for ($j = 0; $breadcrumbs[$j] != 0; $j++) {
                printf ("%d\n", $breadcrumbs[$j]);
                                           \\prints list of poles passed;
                                           \\other types of directions can be
                                           \\printed in accordance with the
                                           \\disclosure.
            }
        }
        if ($received != 0) {
            $breadcrumbs[$i] = lookupUniqueIdentifier ($received);
        }
    }
}
```

What is claimed is:

1. A method comprising:
    periodically monitoring, by a server, location of a receiving device by periodically receiving location information from the receiving device traversing from a first location to a second location,
        wherein the location information is broadcasted by a plurality of beacon devices, captured by the receiving device, and periodically transmitted to the server by the receiving device,
    identifying, by the server, at least the first location and the second location associated with the receiving device;
    receiving, by the server from the receiving device when the receiving device is located at the second location, a request to display a traversed path; and
    displaying, by the server on a graphical user interface of the receiving device, instructions to reach the first location, wherein the server notifies the receiving device when a second receiving device is located within the traversed path.

2. The method of claim 1, further comprising:
    monitoring, by the server, the receiving device after displaying the instructions to reach the first location.

3. The method of claim 2, further comprising:
    transmitting, by the server, a notification to the receiving device when the receiving device is not located along the traversed path.

4. The method of claim 1, wherein the server identifies a location of the receiving device based on a strength of a signal received, by the receiving device, from the plurality of beacons.

5. The method of claim 1, further comprising:
    transmitting, by the server, a notification to the receiving device when the server determines that the receiving device is located at the first location.

6. The method of claim 1, wherein the server further displays a point of interest associated with the receiving device's location.

7. The method of claim 1, wherein the receiving device is a cellular phone.

8. The method of claim 1, wherein the receiving device is a wearable electronic device.

9. The method of claim 1, wherein the server identifies the location of the receiving device based on its unique identifier.

10. A beacon management system comprising:
    a plurality of beacon devices, wherein each beacon from the plurality of beacons is configured to broadcast location information;

a receiving device configured to receive location information from the plurality of beacons and transmit the location information to other electronic devices and servers;

a server in communication with the plurality of beacons and the receiving device, where the server is configured to:

periodically monitor location of the receiving device by periodically receiving location information from the receiving device traversing from the first location to the second location, wherein the location information is broadcasted by the plurality of beacon devices, captured by the receiving device, and periodically transmitted to the server by the receiving device, wherein the server identifies at least a first location and a second location associated with the receiving device;

receive, from the receiving device when the receiving device is located at the second location, a request to display for a traversed path;

display, on a graphical user interface of the receiving device, instructions to reach the first location, wherein the server notifies the receiving device when a second receiving device is located within the traversed path.

11. The system of claim 10, wherein the server is further configured to:
monitor the receiving device after displaying the instructions to reach the first location.

12. The system of claim 11, wherein the server is further configured to:
transmit a notification to the receiving device when the receiving device is not located along the traversed path.

13. The system of claim 10, wherein the server identifies a location of the receiving device based on a strength of a signal received, by the receiving device, from the plurality of beacons.

14. The system of claim 10, wherein the server is further configured to:
transmit a notification to the receiving device when the server determines that the receiving device is located at the first location.

15. The system of claim 10, wherein the server further displays a point of interest associated with the receiving device's location.

16. The system of claim 10, wherein the receiving device is a cellular phone.

17. The system of claim 10, wherein the receiving device is a wearable electronic device.

18. The system of claim 10, wherein the server identifies the location of the receiving device based on its unique identifier.

* * * * *